April 14, 1970     A. M. ROSFELDER     3,506,363
ANGLE MEASURING AND SIGHTING INSTRUMENT INCLUDING
MEANS TO SELECTIVELY VIEW A COMPASS
Filed May 23, 1966

3,506,363
ANGLE MEASURING AND SIGHTING INSTRUMENT INCLUDING MEANS TO SELECTIVELY VIEW A COMPASS
André Marcel Rosfelder, La Jolla, Calif., assignor, by mesne assignments, to Tetra Tech, Inc., La Jolla, Calif.
Filed May 23, 1966, Ser. No. 552,017
Claims priority, application Switzerland, June 4, 1965, 7,863/65
Int. Cl. G01c 17/10
U.S. Cl. 356—147                     5 Claims

ABSTRACT OF THE DISCLOSURE

A sighting instrument is provided in which a sighting member observes in a fixed plate one object viewed directly through the plate and an image of another object reflected from a movable mirror which also reflects the image of a compass mounted on the base, the movable mirror being driven from a manual control member through a reducer, the control member carrying an arm which passes on a scale to indicate the angle between the lines of sights to the objects while the reducer acts on a multiplying gear arrangement which controls readings on a second scale to provide minutes of angle.

---

Sighting instruments for the survey of a geographical position are already known, including a tighting member and two mirrors, one of which is stationary and the other free to swivel, as well as a magnetic compass. These instruments permit sighting two objects simultaneously, one by direct sighting and the other by reflected sighting on the two mirrors, the position of the swivelling mirror being adjusted to permit the superposition of the two sighted objects, the position obtained permitting measuring the arc separating the two objects and the centre of which is on the side of the instrument.

An object of the invention is to provide an instrument, in which the measurement may be effected in a very simple manner and with great accuracy, due to the provision of a gear reducer ensuring the drive of the swivelling mirror from a manual control member, the swivelling mirror having a position permitting the sighting of the magnetic compass.

The accompanying drawing shows, diagrammatically and by way of example, one embodiment and one variant of the object of the invention.

Figures 1, 2:
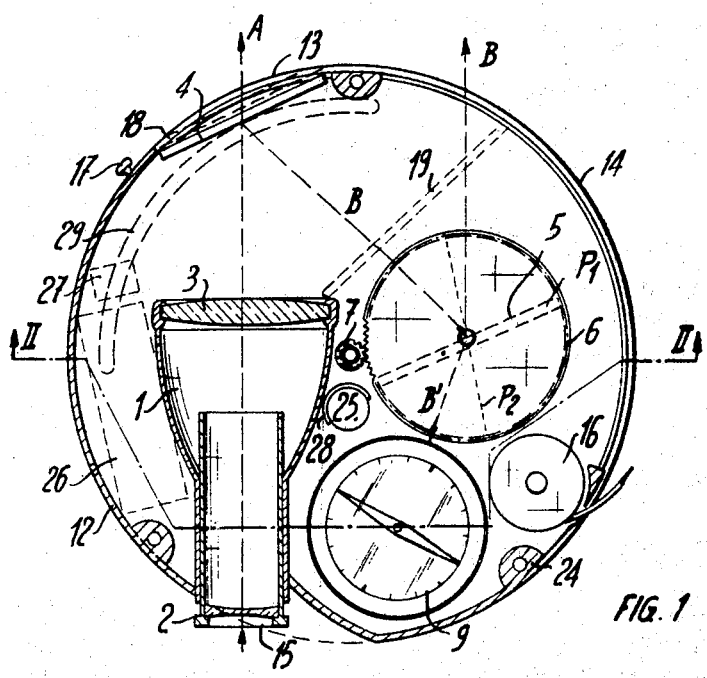
FIG. 1 is a sectional view along the main plane of the instrument according to the embodiment.
FIG. 2 is a partial section along the broken line II—II of FIG. 1.
Figure 3:
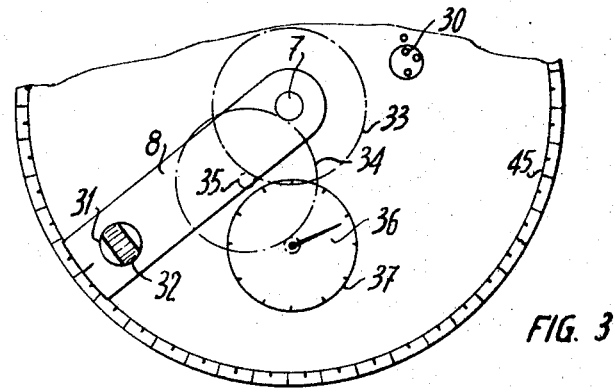
FIG. 3 is a partial view of one face of the instrument.

The instrument shown in FIGS. 1 to 3 comprises a Galileo telescope 1 including a slidably mounted eye-piece 2, and a converging lens 3. This telescope is mounted in a case 12 and permits sighting in the direction of the arrow A. This sighting is realized through a glass pane 4 the upper half 4a of which is transparent, whereas the lower half 4b is reflecting, so as to constitute a fixed mirror.

The optical beam is thus divided into two parts, one of which is constituted by the rays passing through the portion 4a of the glass pane 4 and the other of which is formed by the rays reflected by the silver, reflecting portion 4b of the pane 4, which permit a sighting along the broken line B after a second reflection on a swivelling mirror 5.

As is shown in FIG. 2, the mirror 5 is mounted on a toothed wheel 6 integral with a lug turning in a bearing 11b of the case 12. This toothed wheel 6 is in mesh with a toothed pinion 7 rotating in a bearing 11a of the case 12, this pinion 7 being integral with an arm 8 the free end of which moves opposite a scale 45 (FIG. 3).

The reduction ratio between the pinion 7 and the wheel 6 is 1:12, so that for a complete revolution of the arm 8, the wheel 6 moves through 30°, which thus permits covering a sighting arc of 60°. The cable 45 is calibrated in sighting degrees, each degree of this scale covering an arc equal to six true degrees. To permit a very accurate movement of the arm 8, the latter is provided with a flexible roller 32 which may be moved by a finger of the user and which is in frictional contact with the upper face of the case 12.

To avoid the results of play between the teeth of the pinion 7 and the wheel 6, the latter is subjected to the action of a torsion spring 10 which is engaged, on the one hand, with said wheel and, on the other hand, with the case 12.

The pivot integral with the toothed wheel 6 is, as is shown in FIG. 3, provided with guide marks 30 indicating the position of the mirror 5. In this way, it is possible to cover a sighting angle greater than 60° corresponding to one revolution of the arm 8, and it is advantageous that this useful angle be of 120°, which corresponds to two revolutions of the arm 8. The guide marks 30 permit ascertaining whether the sighting angle is included between 0 and 60° or between 60 and 120°. These guide marks also indicate a supplementary position in which the visual ray passing through the telescope 1 is reflected by the pane 4, and then reflected by the mirror 5 in a direction B' permitting the observation of a magnetic compass 9 at the same time as the sighting through the pane 4. This magnetic compass carries a vertical drum dial graduated from 0 to 360°.

This magnetic compass, being placed inside the case 12, must be illuminated, and this is effected by means of a bulb 25 provided with a reflecting screen 28 directing the light towards the compass 9 and preventing its diffusion towards the mirrors 4 and 5. This bulb 25 is energized by a battery 26 and actuated by a micro-switch 27.

The case further carries an inclinometer constituted by a transparent tube 29 extending along an arc of a circle of 90° and containing either a bubble of air in a liquid or a small drop of mercury. Adjacent this tube is disposed a lateral graduation from 0 to 90°. It is thus possible to measure the inclination of a slope by directing a guide line carried by the case 12 to make it parallel to the slope. This guide line could in particular be constituted by the folding handle 22 provided for the case 12, as is shown in FIG. 2.

This folding handle 22 is provided with a housing 21 in which may be placed filters 20 carrying on one side a projecting part 23 permitting gripping them with ease. These filters may be placed at will either in the direct sighting line, by making them slide in grooves 18 of the case 12, or on the reflected sighting line by making them slide in grooves 19. One may thus place absorbing or polarizing filters in order to attenuate incident light. Such filters are indispensable if one of the sighting points is the sun.

The instrument further comprises a screen 16 rolled on a spring pin and provided, at its free end, with hooking means. This screen is shown in the rolled position in FIG. 1, that is to say in the position of use of the sighting instrument. In the position of non-use, the screen 16 is unrolled so as to cover the openings 14 and 13 which are provided in the cylindrical wall of the case 12 for the passage of the visual sighting rays. The screen 16 is then held in the closing position of these openings by hooking its end on a lug 17 disposed adjacent the window formed by the glass pane 4.

As is shown in FIG. 3, the pinion 7, which is integral with the arm 8 for controlling the orientation of the mirror 5, is provided with a toothed wheel 33, not shown in FIGS. 1 and 2, which meshes with a pinion 35 integral with a toothed wheel 34, which is itself in mesh with a toothed pinion integral with a pointer 36. These toothed wheels constitute a mutliplying gear train driving the pointer 36 over a circular scale 37. The multiplication ratio is chosen so that the pointer 36 makes one complete revolution for each degree of the sighting angle and thus readily permits the reading of a minute of angle.

It is obvious that according to a simpler embodiment, this pointer 36 indicating angle minutes could be eliminated and replaced by a sliding-gauge disposed at the free end of the arm 8 and also permitting a very accurate reading of the position of said arm.

Figure 4:
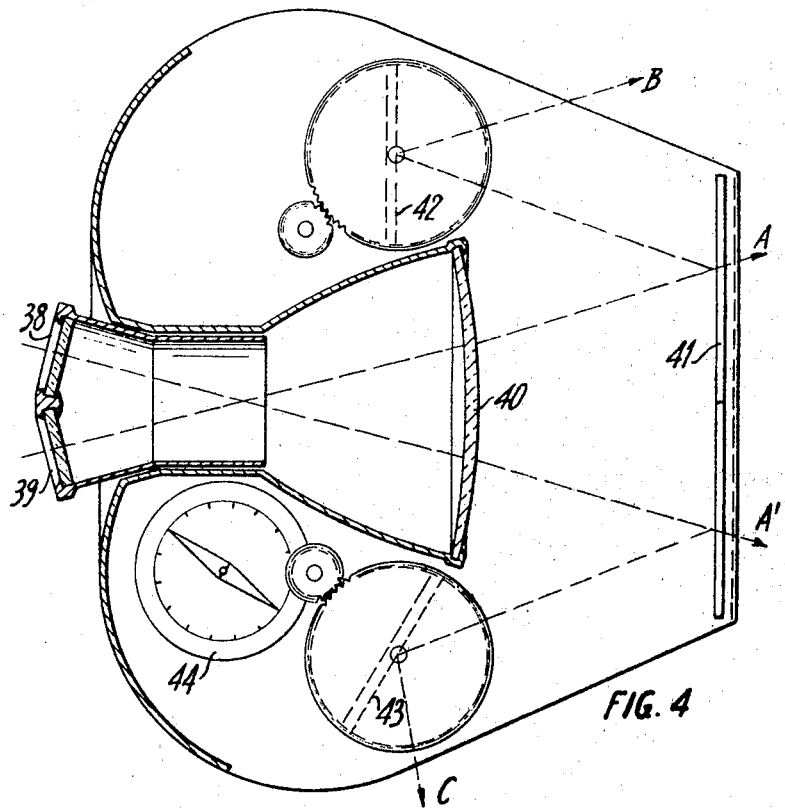
FIG. 4 shows diagrammatically the variant.

FIG. 4 shows a variant adapted to permit the measurement of two angles between three sighting points and useful for preserving the measurment of one angle while one effects the measurement of the other angle. To this end, the instrument is provided with a sighting telescope including two eye-pieces 38, 39 permitting sighting along two different optical axes passing through a single converging meniscus 40. The two sighting rays terminate in a mirror 41 one part of which is translucent to permit direct sighting, the other part of this mirror 41 reflecting the light rays onto a swivelling mirror 42 for the measurement of the left angle, and respectively onto a mirror 43 for the measurement of the right angle.

By slightly moving the instrument in front of the eye, one can thus cause to appear in front of the eye-piece 38 the images of the first sighting point A' and of the second sighting point C forming the right angle, and, in front of the eye-piece 39, the images of the first sighting point A and of the third sighting point B forming the left angle. A single optical beam, for example that of the eye-piece 38, may be directed towards the magnetic compass 44 in order to obtain the survey of the first sighting point situated between the other two.

For all its other details, that is to say filters, inner lamp, electric battery, contact, mounting of the mirrors, device for reading the sighting angles, etc., this instrument is comparable to the preceding one, the main difference being that it will thus comprise two independent driving and reading mechanisms for each of the movable mirrors 42 and 43.

One may, of course, provide different modifications for the instruments described and in particular provide a tapped central orifice under the lower face to permit their being fixed on a tripod. As a variant, this attachment could also be effected by means of outer side grooves provided on the cylindrical wall of the instrument.

The instrument could also easily be completed by a level to verify its horizontality, this level being a circular bulb level placed on the upper face of the instrument. This latter could also be completed by a horizon device, for example placed in front of the window 13 in the case of FIG. 1, to permit the survey of vertical angles when the natural horizon is not visible. This device, known per se, consists of a reticle oscillating under the effect of a weight.

Finally, the screen 16 could, of course, be replaced by one or several curved thin plates conforming to the cylindrical shape of the case and slidable along the wall to open or close the window 14. In such a case, the bulb 25 could be more easily placed at the location now free as a result of the absence of the rolling pivot for the screen 16.

I claim:

1. A sighting instrument comprising a base carrying a sighting member for viewing a first object, at least two mirrors, one of said mirrors being located along the sighting axis of said sighting member for producing in said sighting member an image of a second object in concurrence with the first object, a magnetic compass, said one of said mirrors being stationary relative to said base while the other is free to swivel, a manual control member for moving the swivelling mirror, a gear reducer operatively connected to said control member and said swivelling mirror, said swivelling mirror having a position in which it reflects the image of the magnetic compass towards the sighting member, said gear reducer comprising a toothed wheel connected to said swivelling mirror for rotation therewith, and a toothed pinion meshing with said toothed wheel and driven by said manual control member, a scale stationary with respect to the base, an arm integral with said toothed pinion and moving over said scale to indicate the angle between the lines of sight to said objects, a multiplying gear train driven by said reducer, a second scale, and a pointer moving over said second scale and driven by said multiplying gear train to permit the reading of said angle of sight in minutes of angle.

2. A sighting instrument as claimed in claim 1, comprising a drum-shaped case forming said base and having a cylindrical face with at least one opening for the passage of the sighting rays, a spring pivot in said case, a screen rolled around said pivot and having hooking means at its free end for removably closing said opening.

3. A sighting instrument as claimed in claim 1, comprising a curved tube on said case at least partially filled with a liquid, said tube forming an inclinometer.

4. A sighting instrument as claimed in claim 1, comprising an eye-piece on said case with two lenses, and including an additional swivelling mirror, said other mirror and said additional mirror having its respective swivelling and scale means to permit the simultaneous reading of two angles to three sighting objects and the simultaneous preservation of the two measured angles.

5. A sighting instrument as claimed in claim 1 said one of said mirrors is a fixed plate, said fixed plate having one-half thereof transparent for viewing the first object, the other half of the fixed plate being a mirror.

References Cited

UNITED STATES PATENTS 2,363,964    11/1944    Howson et al. _____ 356—17
2,953,060    9/1960    Carbonara _____ 356—144
3,217,415    11/1965    Madden _____ 356—146

JEWELL H. PEDERSEN, Primary Examiner

O. B. CHEW II, Assistant Examiner